(12) United States Patent
Jinnai (10) Patent No.: US 6,409,483 B2
(45) Date of Patent: Jun. 25, 2002

(54) VARIABLE-CAPACITY TURBINE

(75) Inventor: Yasuaki Jinnai, Kanagawa-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/767,735

(22) Filed: Jan. 24, 2001

(30) Foreign Application Priority Data

Jan. 24, 2000 (JP) ........................................ 2000-013598

(51) Int. Cl.$^7$ ............................................... F02B 17/00
(52) U.S. Cl. ..................... 417/407; 60/602; 415/159; 415/160; 415/163; 415/164; 415/165; 415/150
(58) Field of Search ........................... 60/602; 417/407; 123/561; 415/150, 160, 163, 164, 165, 159

(56) References Cited

U.S. PATENT DOCUMENTS

| | | | | |
|---|---|---|---|---|
| 4,893,474 A | * | 1/1990 | Miller et al. | 60/602 |
| 5,146,752 A | * | 9/1992 | Bruestle | 60/602 |
| 5,205,125 A | * | 4/1993 | Potter | 60/602 |
| 5,701,741 A | * | 12/1997 | Halsall | 60/602 |
| 6,269,642 B1 | * | 8/2001 | Arnold et al. | 60/602 |

FOREIGN PATENT DOCUMENTS

| | | | | |
|---|---|---|---|---|
| GB | 2 217 790 A | * | 11/1989 | 415/159 |
| JP | 2008870 A | * | 1/2000 | |
| JP | 200199433 A | * | 7/2000 | |

* cited by examiner

Primary Examiner—Thomas Denion
Assistant Examiner—Thai-Ba Trieu
(74) Attorney, Agent, or Firm—Wenderoth, Lind & Ponack, L.L.P.

(57) ABSTRACT

A nozzle drive mechanism is provided for a link plate 112, which can operate all nozzle vanes smoothly and synchronously. The nozzle vanes 104 supported in such a way that the nozzle vanes are free to rotate between open and closed positions on nozzle shafts. The nozzle vanes are connected to levers which correspond to the nozzle shafts so as to rotate along with the levers. Each boss at the end of each lever 114 functions as a shaft which is parallel to the nozzle shaft. The shafts (bosses) in the nozzle vanes engage in oblong holes in the link plate in such a way that they are free to swing, and are thereby connected to the link plate. A declined straight or curved centerline which runs through the oblong hole to the oblong direction, extends at a given angle with respect to the radius of the link plate.

3 Claims, 7 Drawing Sheets

VARIABLE-CAPACITY TURBINE

BACKGROUND OF THE INVENTION

1. Field of the Invention

This invention concerns a variable-capacity turbocharger which can control an amount of exhaust gas provided into a turbine compartment by operating nozzle vanes. More specifically, the invention concerns an improvement of a nozzle drive mechanism to transmit to the nozzle vanes a displacement of an actuator which operates the nozzle vanes.

2. Description of the Related Art

A turbocharger is an effective means to increase the output of an internal combustion engine. A turbine is rotated by exhaust gas from the engine, and a compressor mounted on a same shaft as turbine pressurizes the air supplied to the engine. Turbochargers are currently installed in a variety of engines. However, the flow rate of the exhaust gas varies with the speed of the engine revolution. The flow rate of the exhaust gas, which is actually supplied from the engine, will not always be in the amount that needed to produce the ideal operating conditions for the supercharger. To rectify this situation and allow the turbocharger capacity to be used to its best advantage, the variable-capacity turbocharger has been developed. In a variable-capacity turbocharger, the flow of the exhaust gas in the turbine compartment is regulated according to the operating state of the internal combustion engine.

This sort of variable turbocharger has a number of nozzle vanes in a nozzle unit of the turbine, which is inside a housing. The nozzle vanes provided on a nozzle shaft are supported in such a way that they can rotate between open and closed positions. The nozzle shaft is connected through a lever to a link plate which has a doughnut shape. The link plate rotates freely on the rotary axis of the turbine. An actuator on the outside of the housing causes the link plate to rotate by means of a transmission mechanism. When the link plate rotates, the nozzle vanes operate synchronously, continuously moving between the open and closed positions to adjust the degree of opening of the nozzle vanes.

In the nozzle drive mechanism to drive the nozzle vanes according to the prior art, the rotary action of the link plate is not transmitted smoothly into the rotary action of the nozzle vanes. To achieve the desired action of the link plate, the actuator on the outside of the housing of the variable turbocharger had to be large enough to produce an appropriate force.

SUMMARY OF THE INVENTION

The technical problem which this invention addressed is to solve the above-mentioned shortcoming in the prior art. The object of this invention is to provide a nozzle drive mechanism for the link plate, which can operate all the nozzle vanes smoothly and synchronously.

The variable-capacity turbocharger which controls the opening degree of the nozzle vanes according to this invention has a turbine provided in a housing, which is free to rotate on a turbine shaft, a plurality of nozzle vanes arranged in nozzle units around the turbine in the housing, a link plate which rotates freely around the turbine provided in the housing, and which is connected to the nozzle vanes by levers and continuously moves the nozzle vanes synchronously between the open and closed positions and an actuator outside the housing, which is connected to the link plate through a transmission mechanism.

The invention disclosed in the first preferred embodiment is a variable turbocharger which is distinguished by the following.

The nozzle vanes are supported in such a way that the nozzle vanes are free to rotate between the open and closed positions on nozzle shafts. The nozzle vanes are connected to levers which correspond to the nozzle shafts so as to rotate along with the levers, and each boss at the end of each lever is provided with a shaft which is parallel to the nozzle shaft. The shafts in the nozzle vanes engage in oblong holes in the link plate in such a way that they are free to swing, and are thereby connected to the link plate. A declined straight or curved centerline which runs through oblong hole to the oblong direction, extends at a given angle with respect to the radius of the link plate.

With the invention disclosed above, the oblong holes in the link plate which receive the shafts of the levers extend in the axial direction at a given angle with respect to the radius of the link plate as defined by its rotational center. Thus, when the link plate rotates, there is a component in the generated force which acts on the link plate at the point of contact of the shaft with the hole which pushes the shaft in the radial direction. The shafts of the levers can move smoothly in the radial direction within the holes in the link plate, and the link plate can operate easily.

The invention disclosed in a second preferred embodiment has curved oblong hole. The curved centerline which runs the oblong hole to the oblong direction, is curved along an arc tangent to the declined straight line extending at a given angle with respect to the radius of the link plate.

With the invention disclosed above, each of the oblong holes in the link plate which receive the shafts of the levers is curved along an arc tangent to a line extending at a given angle with respect to one of the radii from the rotational center of the link plate. When the link plate rotates, the component of the pushing force on the shaft which acts in the radial direction is greater than that of the invention disclosed in the first preferred embodiment of this application. This allows the shafts of the levers to move more smoothly in the radial direction within the holes in the link plate.

In these drawings, 10 is a variable-capacity turbocharger, 50 is an actuator, 52 is a rod, 54 is a link member, 104 is a nozzle vane, 112 is a link plate, 112$d$ is an oblong hole on the link plate, 112$d$ is an oblong hole according to another preferred embodiment, 114 is a lever, 120 is a swinging member, 130 is a bridge, 140 is a roller.

DETAILED DESCRIPTION OF THE PREFERRED EMBODIMENTS

In this section, several preferred embodiments of this invention will be explained with reference to the appended drawings. Whenever the shapes, relative positions and other aspects of the parts described in the embodiments are not clearly defined, the scope of the invention is not limited only to the parts shown, which are meant merely for the purpose of illustration.

In this section, two preferred embodiments of the invention will be explained with reference to the appended drawings.

Figure 1:
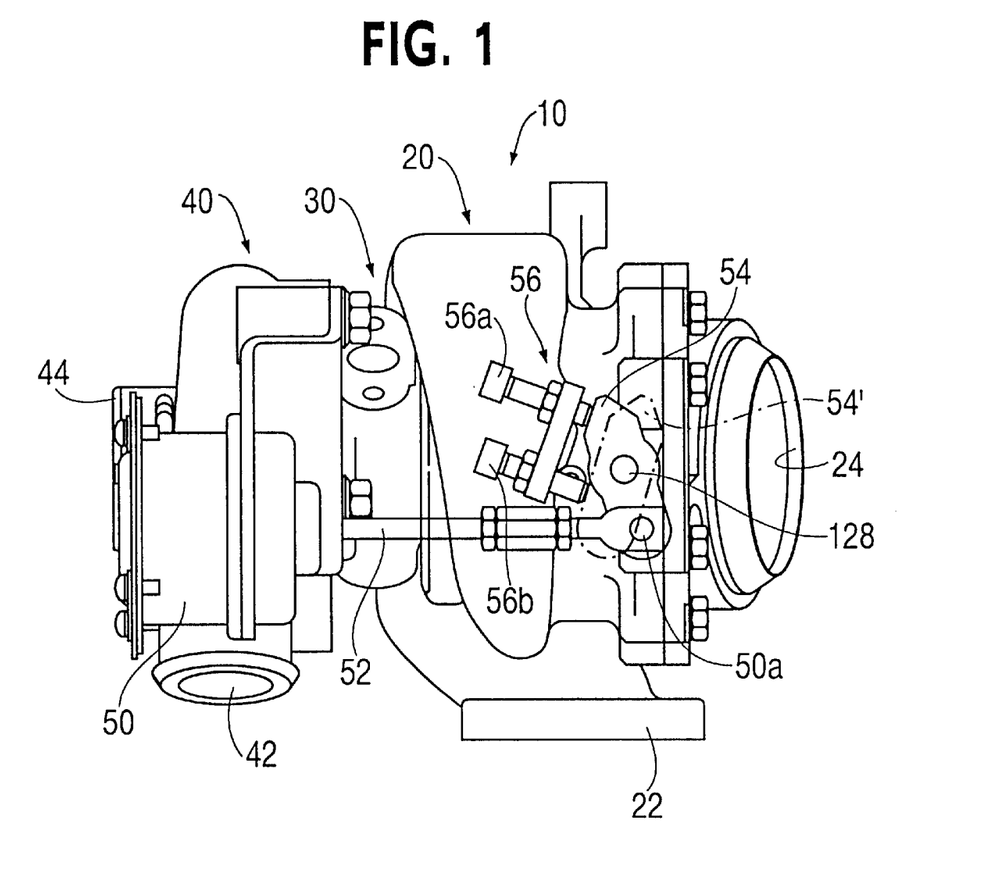
FIG. 1 is a lateral view of an exterior of a variable-capacity turbocharger in which this invention is implemented.

FIG. 1 illustrates the external appearance of a variable-capacity turbocharger 10 in which this invention has been implemented. The variable-capacity turbocharger 10 includes a housing, which comprises a turbine housing 20, a compressor housing 40 and a main housing 30, which is between the turbine housing 20 and the compressor housing 40. The turbine housing 20 has an intake port 22 and an exhaust port 24. The compressor housing 40 has an intake port 44 and a discharge port 42.

On the outside of the housings 20, 30 and 40 is an actuator 50, which drives nozzle vanes (to be explained shortly). The actuator 50 uses air pressure, or more specifically, uses negative pressure of air sucked into an internal combustion engine (not pictured) on which the variable-capacity turbocharger 10 is installed, to cause a rod 52 to move forward and back. It is, however, possible in this invention to replace the actuator 50 with any type of actuator which functions the same, such as an active pressure actuator, or a magnetic actuator.

Figure 2:
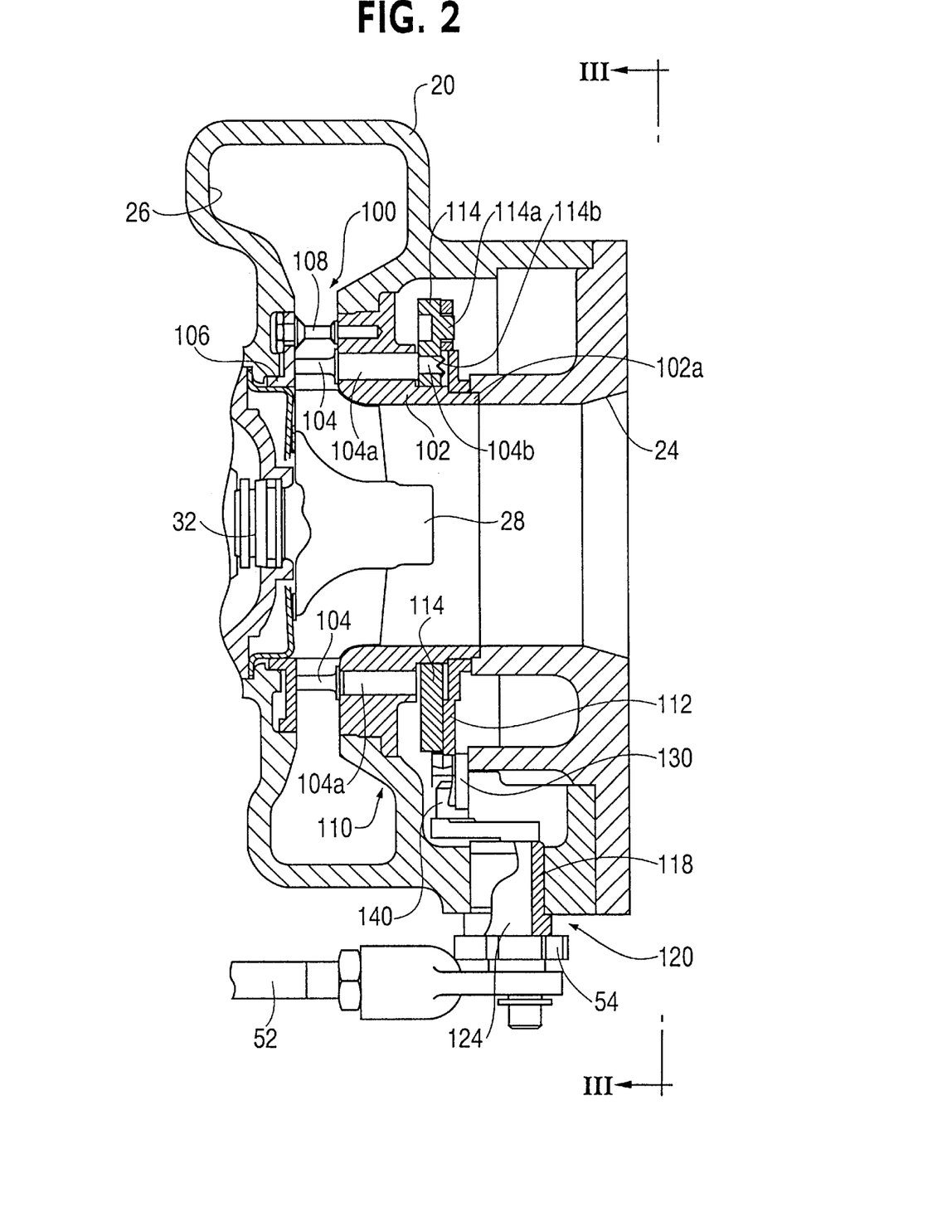
FIG. 2 is a cross section of a turbine compartment in the first preferred embodiment.

The turbine compartment, especially the main housing 30, is shown in FIG. 2. As can be seen in FIG. 2, a turbine shaft 32 is supported in the main housing 30 in such a way that it is free to rotate. A turbine 28, which is mounted to one end of the turbine shaft 32, is inside the turbine housing 20. The exhaust gas from the internal combustion engine is conducted from an intake port 22 into the turbine housing 20. The exhaust has is supplied to the turbine 28 through a scroll channel 26, which is created on the inside of the turbine housing 20, and a nozzle unit 100, which is the inlet to turbine 28. After it drives the turbine 28, the exhaust gas which was supplied is exhausted through an exhaust port 24.

Figure 3:
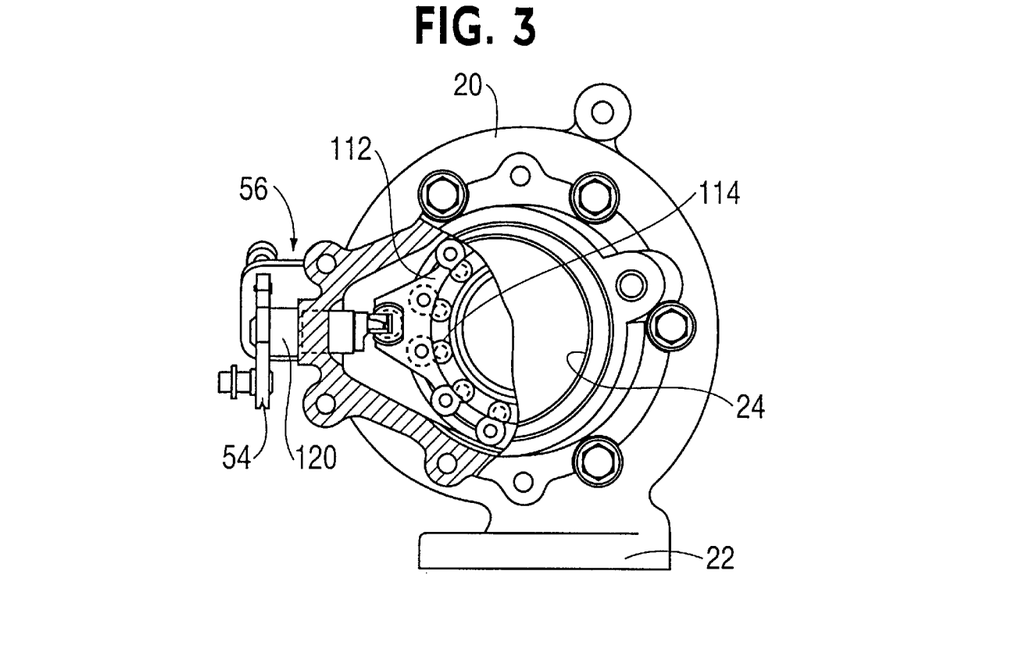
FIG. 3 is a partially cut away frontal view of the variable-capacity turbocharger in FIG. 1.

The nozzle unit 100 comprises a mounting plate 102, which is fixed to the turbine housing 20, and a side plate 106, which faces the mounting plate 102 and is mounted in the axial direction. A number of nozzle vanes 104 are placed between the two plates at regular intervals along the circumference of the shaft. At the base of each of the nozzle vanes 104 is a shaft portion 104a, which is mounted to the mounting plate 102 so that the portion 104a is free to rotate the vanes between the open and closed positions. An end 104b of each shaft portion 104a of the nozzle vane assembly 104 goes through the mounting plate 102 in the axial direction. The shafts are connected to various levers 114 which correspond to the nozzle vanes 104. (See FIGS. 3 and 4). The nozzle vane 104 rotates via nozzle shaft 104a according to the rotation of the lever 114. Each of the levers 114 has a hole 114b to receive the end 104b of one of the shaft portions 104a, and a boss, shaft portion 114a, on the side opposite the hole 114b.

The shaft 114a of the levers 114 can slide within oblong holes 112d provided at regular intervals along the circumference of the link plate 112. There is a cylindrical boss 102a on the side of mounting plate 102 opposite nozzle unit 100. The annular link plate 112 (See FIG. 5) is mounted to the boss 102a so that it is free to rotate on the rotational axis of the turbine 28. The link plate 112 has a series of the oblong holes 112d at regular intervals along its circumference to receive the shaft portions 114a of levers 114. Further, the link plate 112 has on the same surface, a trapezoidal elongated portion 112a on one side. The end of the elongated portion 112a is divided into two portions to form locking arms 112c. The two arms 112c form a rectangular recession 112b.

Figure 6:
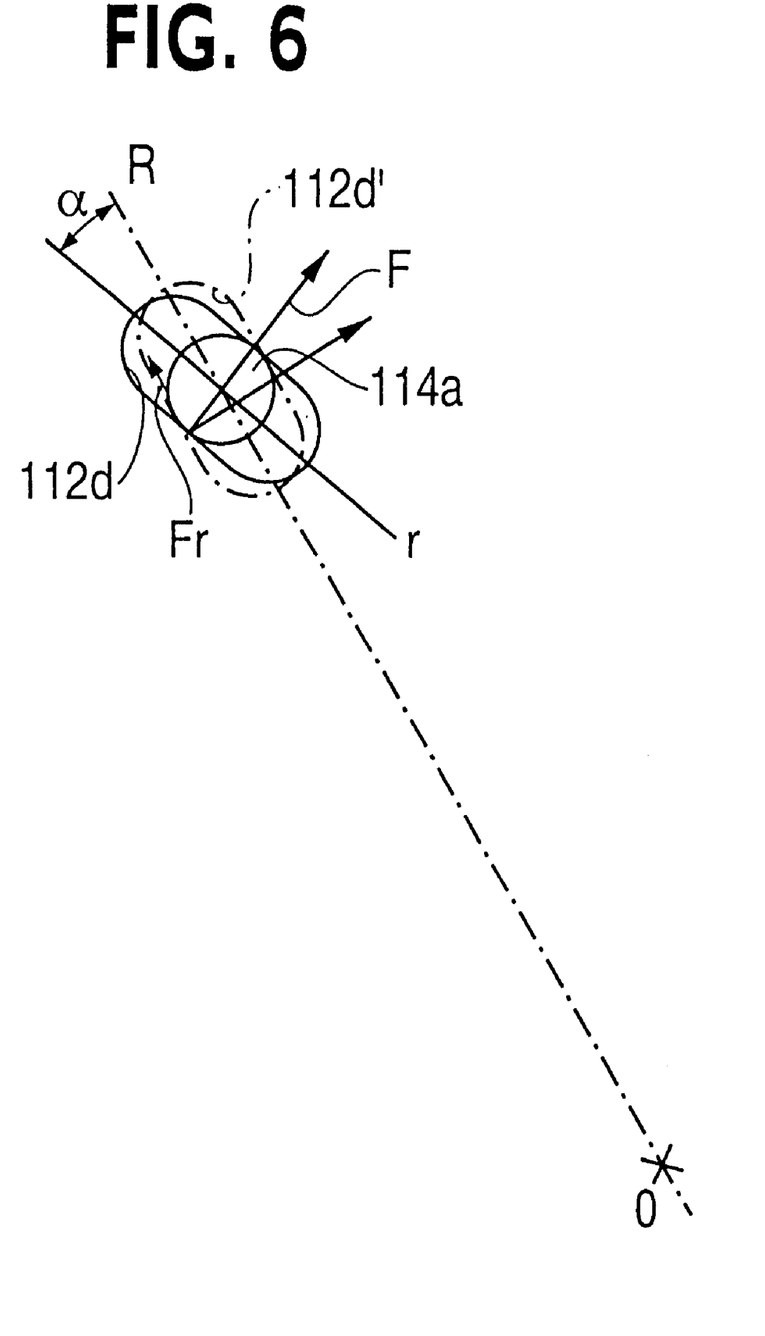
FIG. 6 is an enlarged view of an oblong hole on the link plate according to a preferred embodiment of this invention.

As is shown in FIG. 6 by the broken line with two dots, in the prior art, an oblong hole 112d of the link plate 112 is formed on a radius of the rotational center of the link plate 112, i.e., the oblong hole 112d' is formed on a radius of a circle whose center is a rotational center O (turbine shaft) of the turbine 28 in the variable turbocharger 10. As we have explained, with this sort of prior art design, the actuator 50 must be able to produce a great deal of force because the link plate 12 does not operate easily. To address this problem, in this embodiment, the center line r, which runs lengthwise through the oblong hole 112d of the link plate 112, is inclined at an angle α with respect to a line R which runs through the center of the oblong hole 112d and the center O of the turbine 28. This design enables the link plate 112 to rotate smoothly and reduces the load imposed on the actuator 50.

The variable-capacity turbocharger 10 of this embodiment also has a transmission mechanism to transmit the action of the actuator 50 to the link plate 112. The transmission mechanism includes the rod 52 of the actuator 50, a link member 54 (see FIG. 1), which is connected to the end of the rod 52 by a pin 50a, a swinging member 120 (see FIGS. 2 and 8), which is connected to the link member 54, and a roller 140 and a bridge 130, which are between the swinging member 120 and the link plate 112, and which serve to connect the transmission mechanism to the link plate 112.

Figure 8:
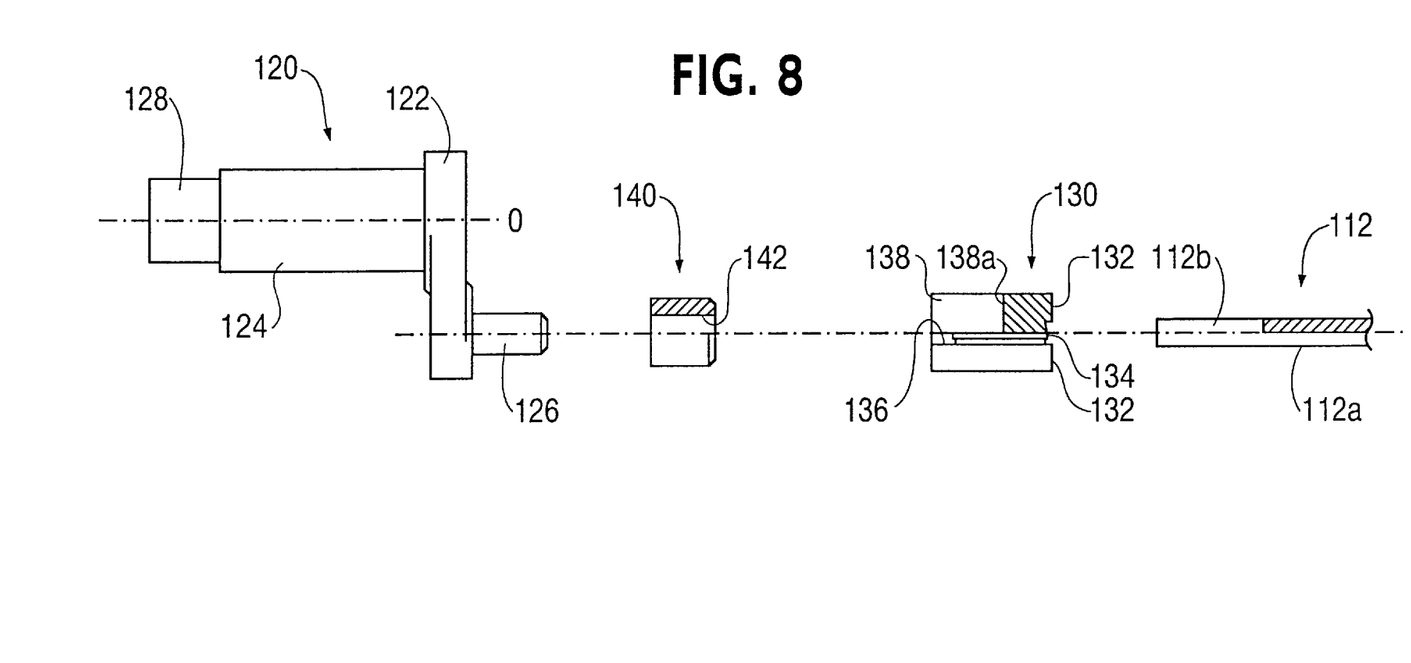
FIG. 8 is an exploded view of the transmission mechanism to transmit to the link plate.

As can be seen in FIG. 8, the swinging member 120 comprises an arm 122, a shaft 124, which extends along a given axis O from one end of the arm 122, and is supported by the turbine housing 20 through a sleeve 118 in such a way that it can freely rotate, a connector 128, which is on the end of the shaft 124 and coaxial with it, and connected to the link member 54 in such a way that it cannot move relative to the link member 54, and a pin 126, which extends from the side of the arm 122 opposite a shaft 124 and is parallel to that shaft. The swinging member 120 may be made of a metallic material, for example, stainless steel. Ideally, the swinging member 120 should be formed of a single piece of austenitic stainless steel. The swinging member 120, arm 122, shaft 124, connector 128 and pin 126 may be formed separately and welded together.

As shown in FIG. 8, a bridge 130 comprises two flat plates 132, which are positioned parallel to each other with a slight gap between them, and a center unit 134, which connects the two plates 132. At the center unit 134, provided between the two plates 132, is a groove 136 in which the locking arms 112c of the link plate 112 engaged. Part of the bridge 130, including the center unit 134, is removed to the middle of the bridge 130 to form a cut-away portion 138. The two opposed surfaces are parallel and slide against each other. As can be seen in FIG. 8, when the transmission mechanism is assembled, the locking unit is formed when the cut-away portion 138 goes into a roller 140, which is mounted on the pin 126 of swinging member 120. The bridge 130 may be made of a metallic material, for example, austenitic stainless steel.

As shown in FIG. 8, the roller 140 is roughly cylindrical, with the diameter of it opening slightly larger than the exterior diameter of the pin 126. The exterior diameter of the roller 140 is slightly smaller than the gap between the sliding surfaces 138 of the bridge 130. The roller 140 may be made of a metallic material, for example, martensite stainless steel.

In this section, the operation of this embodiment will be explained.

When the internal combustion engine operates, a negative intake pressure is created according to the engines rate of revolution and the openness of its throttle. Then, the pressure is controlled by a magnetic valve to transmit it to the actuator 50. The actuator 50 operates according to this pressure. The rod 52 moves forward and back in the axial direction (to the right and left in FIG. 1) according to the magnitude of the negative intake pressure. When the rod 52 operates, the link member 54 rotates on the shaft 124 of the swinging member 120 in response. As can be seen in FIG. 1, the link member 54, which is shown by solid lines, is in contact with a bolt 56a on the top of a stop 56. At this point, the nozzle vanes 104 are in the open position, the position which produces the maximum nozzle opening. When the engine is operating at low r.p.m., or the throttle is only slightly open, the actuator 50 draws back the rod 52. As the rod 52 draws as far back as it can go, the link member 54 moves into a position in which it is in contact with a bolt 56b on the lower portion of the stop 56, as shown by the dotted lines. At this point, the nozzle vanes 104 are in the position which produces the smallest nozzle opening.

Figure 4:
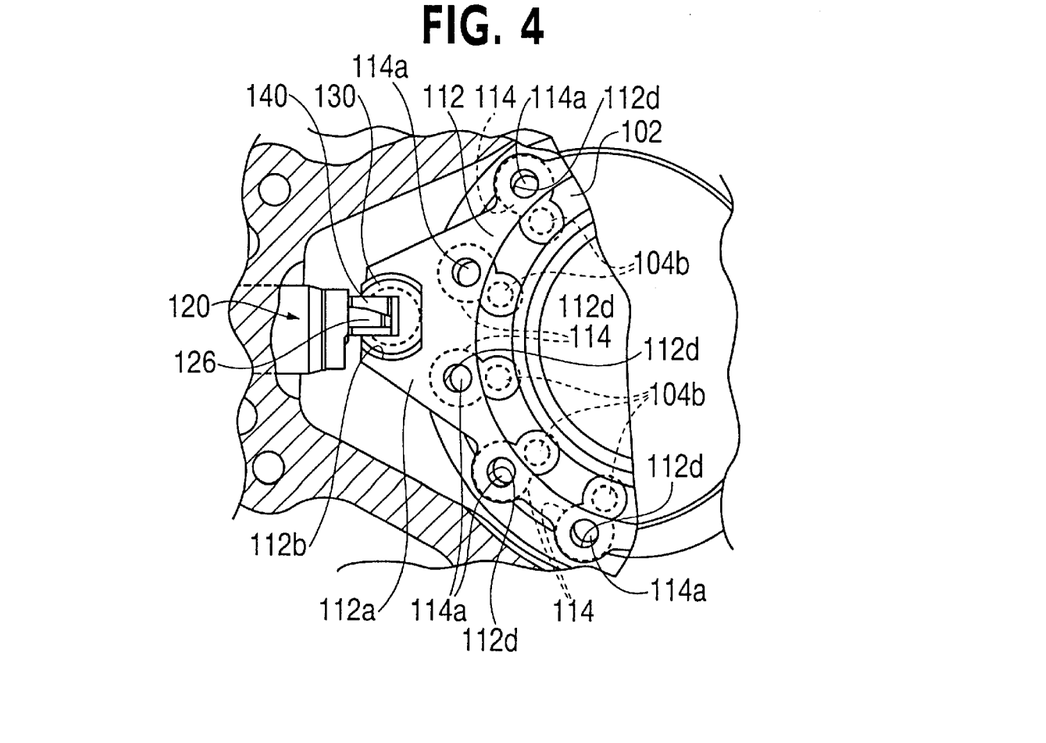
FIG. 4 is an enlargement of a portion of FIG. 3. It shows a transmission mechanism which transmits an action of an actuator to a link plate and elements which link the two.
Figure 5:
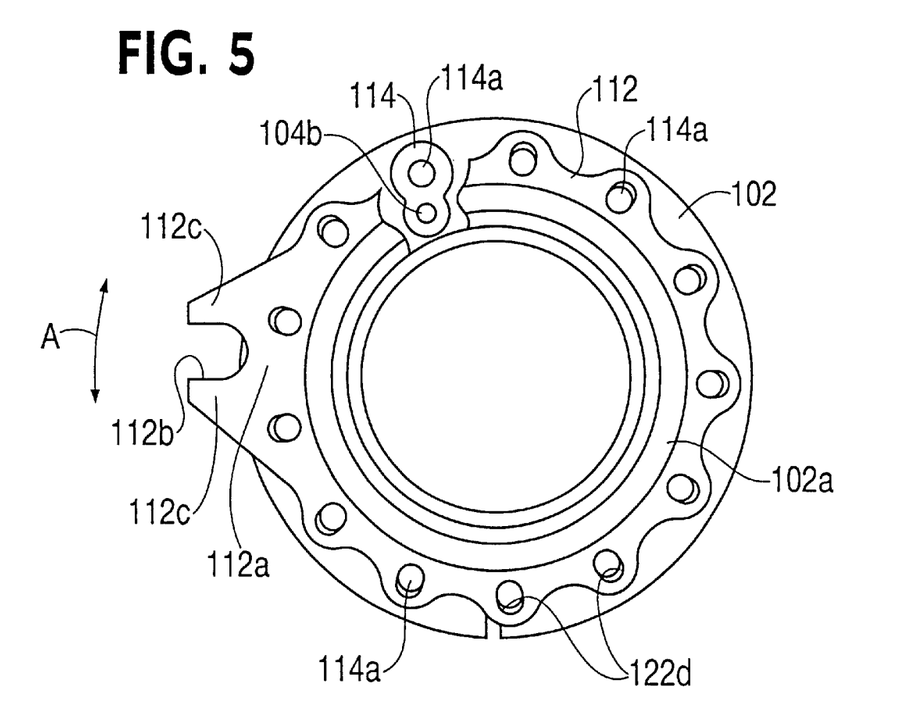
FIG. 5 is a plan view of the link plate shown in FIG. 4.

In this way, the linear movement of the rod 52 is converted by the link member 54 into the swinging motion of the swinging member 120. The pin 126 of the swinging member 120 moves in an arc around the axis O of the shaft 122, as shown in FIGS. 4 and 5. At this point, the pin 126 and the roller 140 are in the cut-away portion 138 in the bridge 130, and the pin 126 is between the roller 140 and a surface 138a. The pin 126 slides upward and downward against the bridge 130 in the relationship shown in FIG. 8, i.e., it slides along the axis of rotation of the turbine 28. At the same time, the link plate 112 rotates around the circumference of the boss 102a on the mounting plate 102, with the rotary axis of the turbine 28 as its center. When the link plate 112 rotates, the lever 114, which is connected to the link plate 112, rotates along with the nozzle vanes 104 with the shaft 104a of the vanes 104 as its center.

The action of the shafts 114a of the lever 114 in the holes 112d of the link plates 112 can be analyzed as action in the circumferential direction around the rotational center O (FIG. 6) of the lever 114 and action in the radial direction. With this first embodiment, each of the holes 112d which receive the shafts 114a of the lever 114 is formed along a centerline r of the oblong hole 112d which describes a given angle α with respect to a radius R from the rotational center O the of link plate 112. When link plates 112 rotate, a component Fr, which pushes each of the shafts 114a along the center line r of the hole 112d, is generated in the force F acting on the lever 114 from the link plate 112 at the point where the shaft 114a is in contact with hole 112d. This component Fr allows the shafts 114a of the lever 114 to move smoothly in the direction of declined center line of the oblong holes 112d of the link plates 112. As a result, the load on the actuator 50 is reduced. In the prior art design, each of the holes 112d' was formed directly on a radius, so either there was no force generated to move the shafts 114a in the direction of the declined center line r within the holes 112d' or only a very small force. This design in the prior art prevented the link plates 112 from operating smoothly.

In FIGS. 5 and 6, the holes 112d of the link plates 112 are oblong, and the ends of the oblong holes are rounded. However, the invention is not limited to only this shape of the holes. The holes 112d could also have a simple rectangular shape. Further, according to the second preferred embodiment, the holes in the link plates 112, as indicated by reference number 112d" in FIG. 7, may be curved to correspond to the course traced by the shafts 114a of the lever 114 when it rotates around the shaft 104a of the nozzle vanes 104.

This design is applicable to a variable turbocharger which is distinguished by the following features. The nozzle vanes are connected to the link plates via shafts which are parallel to the shaft of the nozzle vanes on the circumference of the link plates. These shafts engage in oblong holes in the lever. Each of the holes in the lever is curved along an arc tangent to a line extending at a given angle with respect to a radius from the rotational center of the link plate.

The oblong hole is provided on the circumference of the link plate 112, and the oblong hole faces perpendicular to the nozzle shaft of the nozzle vane. The shaft 114a of the lever 114 engages with the oblong hole 112d and slides within the inner surface of the oblong hole. As mentioned above, therefore, the shaft 114a can slide within the oblong hole which is curved along an arc tangent to a line extending at a given angle with respect to a radius from the rotational center of the link plate.

Figure 7:
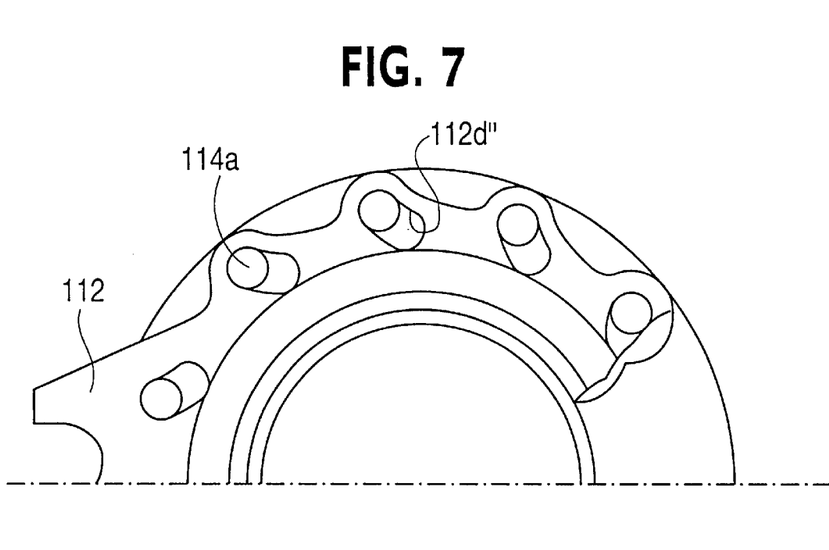
FIG. 7 is a partial plain view of the link plate according to another preferred embodiment of this invention.

With this second embodiment, each of holes 112d" of the link plates 112 is curved along an arc tangent to a radius r extending at a given angle α with respect to a radius R from the rotational center O of the link plate 112. When the link plate rotates, the component of the force which pushes the shaft 114a in the direction of the radius R is greater than in the first embodiment. More specifically, when the shape of each of the holes 112d" in the link plate 112 corresponds to the course traced by the shaft 114a of the lever 114, the shafts 114a of the lever 114 can move even more smoothly in the radial direction R within the holes 112d" in the link plate 112.

Only the limited preferred embodiments of the invention have been discussed. However, the scope of the invention is not limited only to these disclosures, and the invention will cover any modification which can be made by a person with ordinary skill in the art.

What is claimed is:

1. A variable-capacity turbocharger comprising:

a housing;

a turbine shaft;

a turbine provided in said housing, said turbine being freely rotatable on said turbine shaft;

a plurality of nozzle shafts;

a plurality of nozzle vanes arranged in nozzle units around said turbine in said housing, said plurality of nozzle vanes being free to rotate between opened and closed positions on said plurality of nozzle shafts, respectively;

a plurality of levers corresponding to said plurality of nozzle shafts, said plurality of levers being respectively connected to said plurality of nozzle shafts such that said plurality of levers and said plurality of nozzle shafts rotate together, wherein an end of each of said plurality of levers has a boss provided as a shaft, said plurality of shafts being parallel to said plurality of nozzle shafts;

a link plate having a plurality of oblong holes and being freely rotatable around said turbine provided in said housing, said link plate being connected to said plurality of nozzle vanes via said plurality of levers, and said link plate being operable to move said plurality of nozzle vanes between the opened and closed positions, wherein each of said plurality of bosses provided at said end of each of said plurality of levers is engaged in one of the plurality of oblong holes provided in said link plate, such that said plurality of bosses are free to swing in the plurality of oblong holes, respectively, and said plurality of bosses are connected to said link plate; and an actuator connected to said link plate through a transmission mechanism, wherein each of the plurality of oblong holes is curved along an arc tangent to a line extending at a given angle with respect to a radius of said link plate, such that when said link plate rotates, a component of a pushing force of each of said plurality of shafts is in a radial direction.

2. The variable-capacity turbocharger according to claim 1, wherein said actuator is one of an active pressure actuator and a magnetic actuator.

3. A link plate comprising a plate having a plurality of oblong holes, said link plate being freely rotatable around a turbine provided in a housing and being connectable to a plurality of nozzle vanes via a plurality of levers, and said link plate being operable to move the plurality of nozzle vanes between opened and closed positions, wherein each of a plurality of bosses provided at an end of each of the plurality of levers is engagable in one of the plurality of oblong holes provided in said link plate, such that the plurality of bosses are free to swing in the plurality of oblong holes, respectively, and the plurality of bosses are connectable to said link plate, wherein each of the plurality of oblong holes is curved along an arc tangent to a line extending at a given angle with respect to a radius of said link plate, such that when said link plate rotates, a component of a pushing force of each of a plurality of shafts as the plurality of bosses is in a radial direction.

* * * * *